United States Patent [19]

Jakubek

[11] 4,294,517
[45] Oct. 13, 1981

[54] ELECTROOPTICAL DEVICE WITH ENCAPSULATED SELF-LUMINOUS BACKLIGHT ASSEMBLY

[75] Inventor: John Jakubek, Watertown, Conn.

[73] Assignee: Timex Corporation, Waterbury, Conn.

[21] Appl. No.: 39,095

[22] Filed: May 14, 1979

[51] Int. Cl.³ .............................................. G02F 1/133
[52] U.S. Cl. ..................................... 350/345; 350/334
[58] Field of Search ................................ 350/345, 334

[56] References Cited

U.S. PATENT DOCUMENTS

| | | | |
|---|---|---|---|
| 4,042,294 | 8/1977 | Billings et al. | 350/345 |
| 4,126,384 | 11/1978 | Goodman et al. | 350/345 |
| 4,167,307 | 9/1979 | Cirkler et al. | 350/338 X |
| 4,214,820 | 7/1980 | Leibowitz et al. | 350/357 |

Primary Examiner—Edward S. Bauer
Attorney, Agent, or Firm—Edward J. Timmer

[57] ABSTRACT

A typical electrooptical device of the invention includes a display, a pod member upon which the display and electronic circuitry for controlling the display are supported, the pod member having a receptacle facing the display, and an improved backlight at least partially received in the receptacle, the backlight comprising a unitary assembly of a transparent carrier medium molded around one or more self-luminous light sources to completely encapsulate them in a protective and readily handleable carrier body of desired exterior shape to fit within the receptacle. In preferred form, the backlight comprises said light sources encapsulated in situ within the transparent carrier medium in the receptacle of the pod member with the receptacle acting as a mold during encapsulation.

10 Claims, 5 Drawing Figures

ELECTROOPTICAL DEVICE WITH ENCAPSULATED SELF-LUMINOUS BACKLIGHT ASSEMBLY

FIELD OF THE INVENTION

The present invention relates to electrooptical display devices and, in particular, those having a self-luminous light source for illumination of the display under low ambient light conditions.

DESCRIPTION OF THE PRIOR ART

Electrooptical display devices, such as liquid crystal displays, have found widespread use as displays for electronic watches, clocks and other information display systems. Liquid crystal display devices are referred to in the art as passive devices in that they do not emit light, but rather rely on external illumination transmitted through or reflected from the display. As a result, liquid crystal devices are more legible in moderate or bright ambient illumination than in dim ambient lighting or total darkness.

Several illumination systems have been devised by prior art workers to provide suitable illumination for a liquid crystal and similar passive displays. One of the first techniques involved placing a small incandescent light bulb behind the display, the light bulb being activated by a suitable push-button switch in conjunction with a battery as a power source. This illumination technique, although providing suitable illumination, exhibits several disadvantages among which are that illumination of the display can only be effected by pushing the switch and that illumination by the light bulb results in a drain on the battery which also powers the display.

In response to these disadvantages, another type of illumination has been devised and is described in the Bergey patent, U.S. Pat. No. 3,722,206 issued Mar. 27, 1973. This type of illumination includes a sealed glass tube coated on its inner surface with a radioluminescing phosphor and filled with a radioactive gas, such as tritium. The radioactive gas emits low energy beta particles which strike the phosphor and thereby induce the emission of visible radiation which is used to illuminate the display. In the patent, the self-luminous radioactive light source is placed in front of the display to provide illumination. However, a more common technique is to position one or more of these light sources behind the display and allow transmission of the light through the display under low ambient light conditions. The Goodmen et al patent, U.S. Pat. No. 4,126,384 issued Nov. 21, 1978, illustrates one such display construction in which tritium gas is disposed between spaced soda-lime glass plates, one of which is coated with cathodoluminescent phosphor and one of which preferably forms the rear glass substrate of the liquid crystal display.

FIG. 1 illustrates another construction technique for certain commercially available liquid crystal displays in which one or more of the self-luminous light sources 2, e.g. glass tubes filled with tritium gas and coated with phosphor, are placed in and adhered to a tray 4 of white metal or other reflective material. As shown, the tray 4 is placed behind the liquid crystal display 6 and transflector 8 and is adhered to the transflector by means of flange 4a on the tray. Behind the tray is a pod member 10 which includes a receptacle 10a in the surface facing the display for receiving at least part of the depending tray platform 4b therein. The receptacle also receives an integrated circuit chip 12 resting on circuit board 13 along with quartz crystal 14 and other electronic circuitry such as contacts 15. The circuit board 13 is supported against the rear surface of the pod member as are batteries 16, the contacts for the electronic circuitry being connected to the display by spaced compressible lead connectors 18 and 20. In twisted nematic liquid crystal display devices, a front and rear polarizer 22 and 24 are also employed in the structure. A clamp 26 holds the aforementioned components together.

In a George et al copending patent application, U.S. Ser. No. 942,725 filed Sept. 15, 1978 now U.S. Pat. No. 4,214,820 of common assignee herewith and entitled "Electrochromic Display with Encapsulated Light Sources", self-luminous radioactive light sources are embedded within the ion-conducting layer inside an electrochromic display itself to provide illumination of indicia or other characters formed on the front glass substrate. Disposition of the self-luminous light sources inside the electrochromic display is necessitated because the rear electrode and/or substrate are opaque.

SUMMARY OF THE INVENTION

The present invention provides an electrooptical device having an improved unitary backlight assembly of the self-luminous type which overcomes the disadvantages of the prior art.

In a typical embodiment of the invention, the electrooptical device includes an electrooptic display for presenting information, e.g. a liquid crystal display of well known construction and a pod member located behind and supporting the display, the pod member having a receptacle in the surface facing the display. An important feature of the invention device is an improved backlight positioned between the display and pod member and at least partially received within the receptacle in the latter, the backlight being characterized as a unitary assembly of a substantially transparent carrier medium molded around one or more self-luminous light sources, e.g. those comprising a glass shell coated with radioluminescing phosphor and filled with radioactive tritium gas, to completely encapsulate the light sources in a transparent protective and readily handleable carrier body of desired exterior shape to be received within the receptacle in the pod member. Preferably, the transparent carrier medium of the backlight assembly includes fluorescent material to increase the luminescence of the backlight. The fluorescent material may be dispersed throughout the carrier medium or in the form of fluorescent tape applied to the molded carrier body. The improved backlight assembly may be adhered to the display or to the pod member receptacle.

In a particularly preferred embodiment, the pod member and backlight are provided as a unitary component in the electrooptical device, an important feature of this embodiment being that one or more of the self-luminous light sources are encapsulated in situ within a substantially transparent carrier medium in the receptacle of the pod member with the receptacle acting as a mold during encapsulation.

The electrooptical device including the improved backlight assembly possesses numerous advantages including, among others, that the encapsulated self-luminous light sources are more rugged and easily handleable during assembly and storage, assembly problems resulting from variabilities in glass tube stress tolerance and tube sealing methods are minimized and adherence of the backlight assembly to other components of the device is greatly facilitated. Furthermore, the luminescence of the backlight assembly can be increased by incorporation of fluorescent material in the transparent carrier medium.

DRAWINGS

Further advantages and objects of the invention will be better understood by reference to the following description, taken in connection with the accompanying drawings, in which.

DESCRIPTION OF THE PREFERRED EMBODIMENTS

Figure 1:
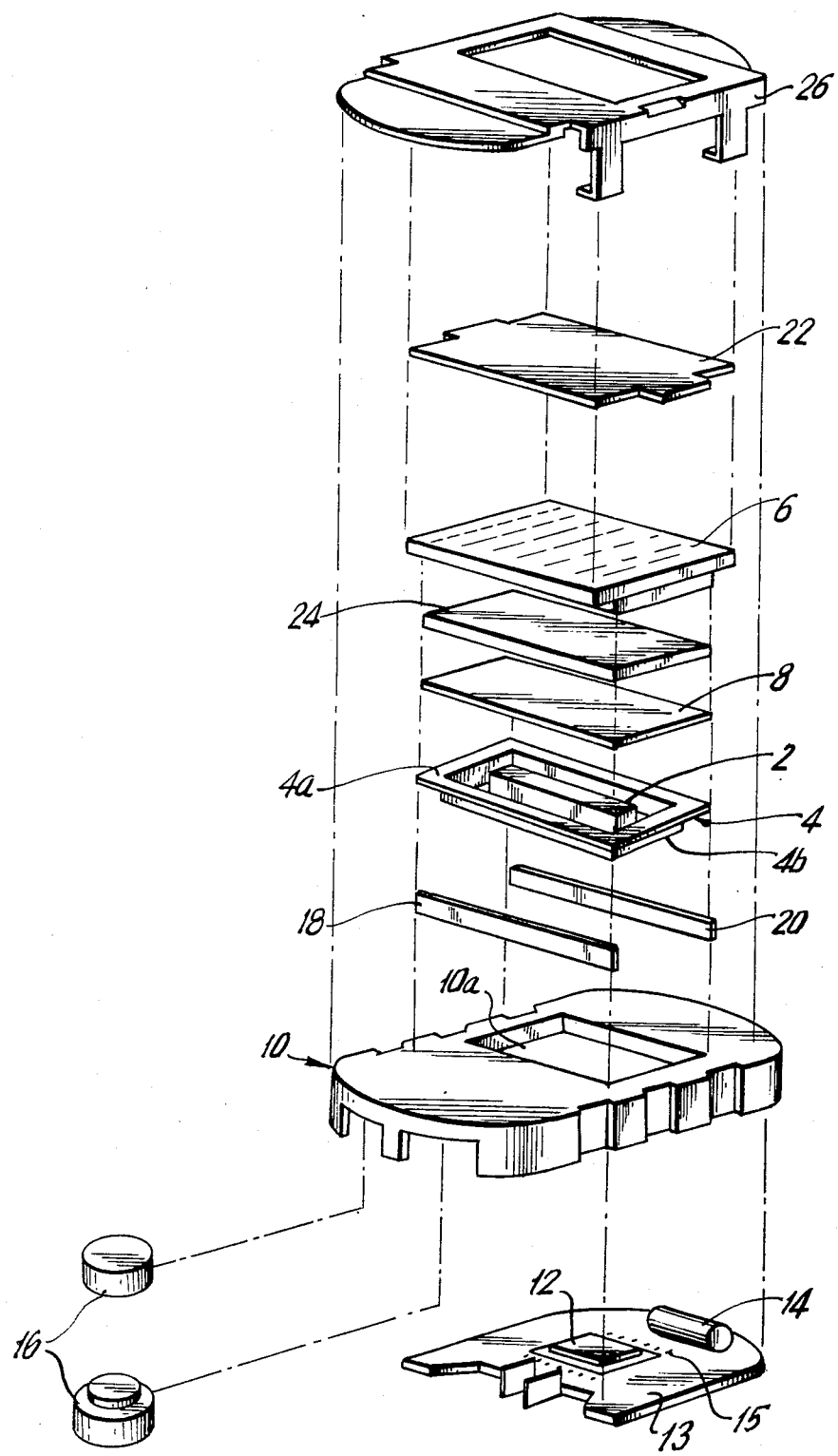
FIG. 1 is an exploded perspective view of a liquid crystal display device of prior art construction.
Figure 2:
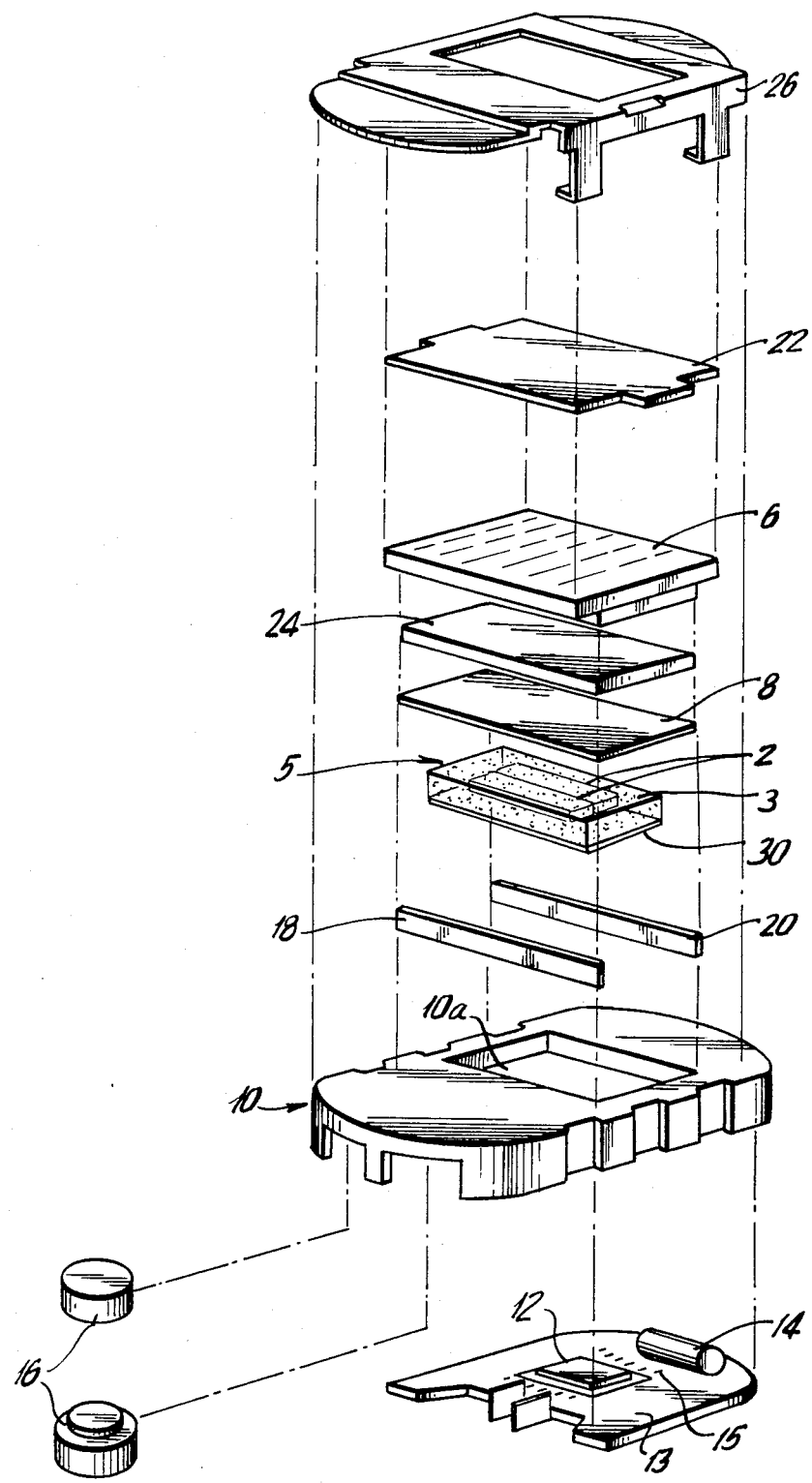
FIG. 2 is an exploded perspective view of a liquid crystal display device of the invention.
Figure 3:
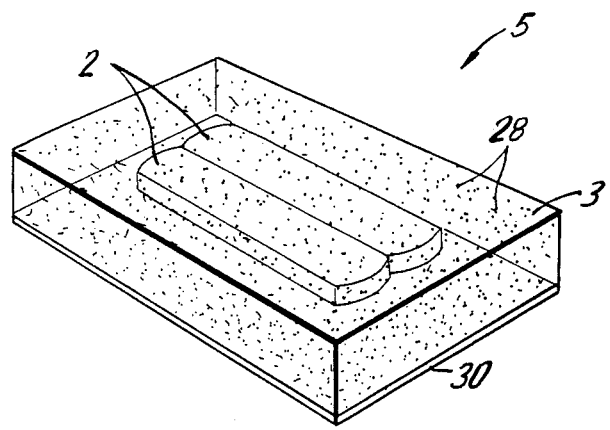
FIG. 3 is an enlarged perspective view of the backlight assembly of the invention.
Figure 4:
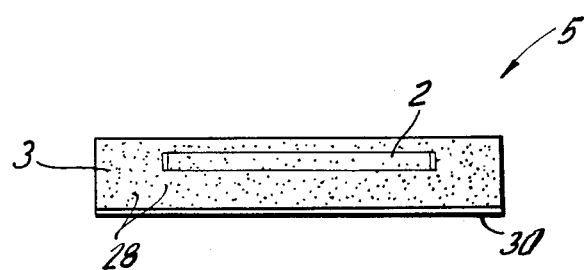
FIG. 4 is a side view of the backlight assembly.

FIG. 2 illustrates a liquid crystal display device including the improved backlight assembly. As is apparent, with the exception of the backlight assembly, the components of that display device are similar to those of the display illustrated in FIG. 1 and like numerals will be used to designate like components. Since the other components have already been discussed hereinabove, only the backlight assembly of FIG. 2 (also shown in FIGS. 3 and 4) will be discussed in detail.

The backlight assembly in these figures is shown as a unitary assembly comprising a substantially transparent carrier medium 3 molded around one or more self-luminous light sources 2 to completely encapsulate the light sources in a protective and readily handleable carrier body 5. The self-luminous light sources 2 are of the type described above; i.e. they each comprise a glass or other transparent shell coated with radioluminescing phorphor and filled with tritium gas or other radioactive material, e.g. as shown in the Clapham, U.S. Pat. No. 3,409,770. Tubular shaped tritium light sources, as shown in the figures, are available commercially from Self-Powered Lighting Corporation and American Atomics Corporation. Light sources having radioactive promethium 147 sealed in glass microspheres together with a phosphor are available from the 3M Company and are described in U.S. Pat. No. 3,147,225. Of course, other similar self-luminous light sources are equally usable in the invention. Preferably, the tubular light sources are arranged side by side with their longitudinal axes aligned so that a more or less rectangular illumination area is formed corresponding generally to the shape of the visible portion of the liquid crystal display. Of course, other light source shapes and alignments are considered within the scope of the invention.

The substantially transparent carrier medium 3 preferably is clear moldable plastic such as epoxy, polycarbonate or acrylic or a clear moldable rubber. Typically, the unitary backlight assembly is prepared by placing the self-luminous light sources in a suitably configured mold and then pouring or otherwise introducing the transparent carrier medium therein. The carrier medium must be moldable in that after curing, setting or like treatments, it assumes and will maintain without external support the shape of the mold. With respect to FIG. 2, the mold is sized and shaped so that the molded carrier body 5 is received within the receptacle 10a between the lead connectors 18 and 20. The materials used may be selected to provide a rigid or a somewhat flexible or pliable transparent carrier body for the light sources, depending of course upon the anticipated service environment to which the electro-optical display device will be exposed. The carrier body supports and protects the fragile light sources from damage during assembly, storage and use in the electrooptical device while providing a readily handleable unitary backlight package during assembly operations. Encapsulation of the light sources with the carrier medium can be automated readily to minimize manual labor and handling of the light sources and thus reduce assembly downtime and costs. Since the glass tubes of the light sources are supported within the carrier body, variabilities in glass stress tolerance and tube sealing techniques are less of a problem during assembly of the electrooptical display device. The molded carrier body can also be attached by adjesive much more easily to the transflector 8 than can the flanges 4a of tray 4 of the prior art backlight since a much larger contact surface area is presented. In addition, the unitary backlight assembly can be attached to the pod member receptacle by adhesive and the like.

Figure 5:
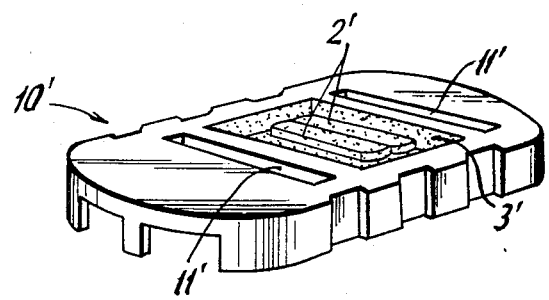
FIG. 5 is a perspective view of a unitary pod member-backlight assembly of the invention.

Another advantageous feature of the invention is that fluorescent material can be included in the transparent carrier medium to increase the overall luminescence of the backlight and thereby enhance viewing of the display in low ambient light conditions. As shown most clearly in FIGS. 3 and 4, the fluorescent material preferably is dispersed throughout the carrier medium, for example, dispersed fluorescent resin or filler 28 and/or applied in the form of fluorescent tape 30 to the rear surface of the molded carrier body 5. FIG. 5 illustrates a particularly preferred embodiment of the invention in which the pod member and backlight are a unitary component. The pod member 10' is slightly modified in that a wall closes off the bottom of the receptacle and that two elongated slots 11' are disposed on opposite sides of the receptacle for receiving lead connectors like those shown in FIGS. 1 and 2 to connect the contacts on the circuit board with the display in like fashion. Preferably, the wall which closes off the bottom of the receptacle is configured to define two spaced parallel slots for receiving and positioning the self-luminous tubes in the desired orientation. With this arrangement, the receptacle in the pod member itself can function as a mold for encapsulating the aforementioned light sources in the transparent carrier medium; for example, by placing one or more of the light sources 2' in the receptacle and then introducing the carrier medium 3' into the receptacle around the light sources. A unitary pod member backlight assembly is thereby formed and useful with the electrooptical device shown in FIGS. 1 and 2 to simplify its structure and assembly. Since the pod member is typically a molded plastic part, the aforementioned modifications to the pod member can be made simply by altering the pod member mold. To increase the luminescence of the unitary pod member-backlight assembly, fluorescent material can be incorporated as already described.

While the invention has been described in detail with respect to a liquid crystal display device, it will find general application to other electrooptical devices which are amenable to backlighting. Of course, other modifications will occur to those skilled in the art and it is desired to cover in the appended claims all such modifications as fall within the true spirit and scope of the invention.

I claim:

1. An illuminated electrooptical device, comprising:
   (a) an electrooptic display;
   (b) a unitary pod member-backlight assembly comprising,
      (1) a pod member located behind and supporting the display, said pod member including a receptacle in a surface facing the display, and
      (2) a backlight comprising at least one self-luminous light source encapsulated in situ within a substantially transparent carrier medium in the receptacle with the receptacle acting as a mold during encapsulation.

2. The device of claim 1 wherein the transparent carrier medium of said backlight assembly is molded plastic or rubber.

3. The device of claim 1 wherein the light source of the backlight assembly is a transparent shell filled with radioactive material and coated with radioluminescing phosphor.

4. The device of claim 1 wherein the shell is glass and the radioactive material is tritium gas.

5. The device of claim 1 wherein the display is a liquid crystal display.

6. The device of claim 1 wherein the transparent carrier medium of the backlight assembly includes fluorescent material to increase luminescence.

7. A unitary pod member-backlight assembly useful in an electrooptical device with a display, comprising:
   (a) a pod member located behind and supporting the display, said pod member including a receptacle in a surface facing said display, and
   (b) a backlight comprising at least one self-luminous light source encapsulated in situ within a substantially transparent carrier medium in the receptacle with the receptacle acting as a mold during encapsulation.

8. The assembly of claim 7 wherein the transparent carrier medium is molded plastic or rubber.

9. The assembly of claim 7 wherein the self-luminous light source is a glass shell containing tritium gas and coated with radioluminescing phosphor.

10. The assembly of claim 7 wherein the transparent carrier medium includes fluorescent material to increase luminescence.

* * * * *